US012763240B2

(12) United States Patent
Brunner

(10) Patent No.: US 12,763,240 B2
(45) Date of Patent: Oct. 13, 2026

(54) ELECTROMAGNETIC PULSE SOURCE USING QUENCHING SUPERCONDUCTING MAGNET

(71) Applicant: Massachusetts Institute of Technology, Cambridge, MA (US)

(72) Inventor: Daniel Brunner, Savannah, GA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1237 days.

(21) Appl. No.: 17/312,784

(22) PCT Filed: Dec. 18, 2019

(86) PCT No.: PCT/US2019/067116
§ 371 (c)(1),
(2) Date: Jun. 10, 2021

(87) PCT Pub. No.: WO2020/132029
PCT Pub. Date: Jun. 25, 2020

(65) Prior Publication Data

US 2022/0068528 A1 Mar. 3, 2022

Related U.S. Application Data

(63) Continuation of application No. 16/223,707, filed on Dec. 18, 2018, now abandoned.

(51) Int. Cl.
*H01F 6/02* (2006.01)
*H01F 6/04* (2006.01)
*H01F 6/06* (2006.01)

(52) U.S. Cl.
CPC ................. *H01F 6/02* (2013.01); *H01F 6/04* (2013.01); *H01F 6/06* (2013.01)

(58) Field of Classification Search
CPC ........................................................ H01F 6/02
See application file for complete search history.

(56) References Cited

U.S. PATENT DOCUMENTS 4,707,147 A * 11/1987 Aoki .................... G01J 5/0018 374/161
4,921,661 A 5/1990 Leuer
(Continued)

FOREIGN PATENT DOCUMENTS

CN 108172308 6/2018
CN 114740244 A 7/2022
(Continued)

OTHER PUBLICATIONS

Machine translation of JP H08191538 (Year: 1996).*
(Continued)

*Primary Examiner* — Paul A Wartalowicz
(74) *Attorney, Agent, or Firm* — Daly, Crowley, Mofford & Durkee, LLP

(57) ABSTRACT

An electromagnetic pulse source comprises a superconducting magnet comprising a coil of superconducting material. At least a portion of the windings of the coil are separated by an electric conductor. A charging circuit is coupled to the two terminals to drive a current through the coil to charge the superconducting magnet and configured to charge the coil to a condition such that the coil enters a quench condition where current flows from one turn of the coil to another turn of the coil through the electric conductor. The quench event may cause a loss of inductance and resulting electromagnetic radiation. A receiver circuit comprising an inductive element is positioned so that the inductive element is mutually-coupled to the coil and the electromagnetic radiation causes a voltage to be induced across the inductive element.

28 Claims, 5 Drawing Sheets

(56) References Cited

U.S. PATENT DOCUMENTS

| | | | | |
|---|---|---|---|---|
| 5,379,020 | A * | 1/1995 | Meier | H02H 9/023 505/879 |
| 5,426,408 | A | 6/1995 | Jones et al. | |
| 5,432,669 | A | 7/1995 | Nemoto et al. | |
| 6,034,324 | A | 3/2000 | Dixon et al. | |
| 6,128,174 | A | 10/2000 | Ritter et al. | |
| 6,313,623 | B1 | 11/2001 | Kojovic et al. | |
| 6,624,624 | B1 | 9/2003 | Karrer et al. | |
| 6,900,714 | B1 | 5/2005 | Huang et al. | |
| 7,307,410 | B2 | 12/2007 | Shiokawa et al. | |
| 7,667,562 | B1 | 2/2010 | Weinstein | |
| 8,598,681 | B2 | 12/2013 | Le Neel et al. | |
| 2003/0051901 | A1 | 3/2003 | Morita et al. | |
| 2005/0111159 | A1 | 5/2005 | Knight | |
| 2008/0106253 | A1 | 5/2008 | Kojovic | |
| 2008/0303511 | A1 | 12/2008 | Grno | |
| 2010/0073146 | A1* | 3/2010 | Kai | G06K 7/0008 340/10.5 |
| 2011/0026170 | A1* | 2/2011 | Husband | H10N 60/30 361/19 |
| 2011/0101950 | A1 | 5/2011 | Babb | |
| 2012/0214674 | A1 | 8/2012 | Blakes et al. | |
| 2013/0063131 | A1 | 3/2013 | Chamarti et al. | |
| 2013/0099787 | A1 | 4/2013 | Lu et al. | |
| 2014/0185165 | A1 | 7/2014 | Rajput-Ghoshal et al. | |
| 2014/0357491 | A1 | 12/2014 | Nakagawa et al. | |
| 2015/0213930 | A1 | 7/2015 | Hahn et al. | |
| 2016/0086707 | A1 | 3/2016 | Hahn et al. | |
| 2016/0156174 | A1* | 6/2016 | Kirby | H01F 6/02 361/19 |
| 2017/0243681 | A1 | 8/2017 | Somerkoski et al. | |
| 2017/0261574 | A1 | 9/2017 | Stainsby et al. | |
| 2018/0287407 | A1 | 10/2018 | Sayre | |
| 2019/0011511 | A1 | 1/2019 | Stainsby et al. | |
| 2019/0088391 | A1 | 3/2019 | Hahn et al. | |
| 2019/0239951 | A1 | 8/2019 | Mu et al. | |
| 2019/0362874 | A1 | 11/2019 | Amano et al. | |
| 2020/0194153 | A1 | 6/2020 | Brunner | |
| 2020/0402692 | A1 | 12/2020 | Brunner et al. | |
| 2022/0359111 | A1 | 11/2022 | Brunner et al. | |
| 2023/0097465 | A1 | 3/2023 | Radovinsky et al. | |

FOREIGN PATENT DOCUMENTS

| | | | |
|---|---|---|---|
| EP | 0482840 | | 12/1994 |
| ES | 2438618 | A1 | 1/2014 |
| JP | S 6431400 | | 2/1989 |
| JP | H0572365 | | 3/1993 |
| JP | H07-183582 | | 7/1995 |
| JP | H08138927 | A | 5/1996 |
| JP | H08191538 | A | 7/1996 |
| JP | 2000277322 | A | 6/2000 |
| JP | 3278446 | | 4/2002 |
| JP | 2008041966 | A | 2/2008 |
| JP | 5594802 | B1 | 9/2014 |
| KR | 10-2004-0107948 | | 12/2004 |
| KR | 10-1194717 | B1 | 10/2012 |
| KR | 10-2016-0120984 | | 10/2016 |
| WO | WO 2011/002174 | A2 | 1/2011 |
| WO | WO 2011/074092 | A1 | 6/2011 |
| WO | WO 2021/195383 | | 9/2021 |
| WO | WO 2021/252765 | | 12/2021 |
| WO | WO 2022/149012 | A1 | 7/2022 |

OTHER PUBLICATIONS

U.S. Appl. No. 17/796,481, filed Jul. 29, 2022, Radovinsky, et al.
U.S. Appl. No. 18/008,507, filed Dec. 6, 2022, Garnier, et al.
Suetomi, et al.; "A Novel Winding Method for a no-insulation layer-wound REBCO Coil to Provide a Short Magnetic Field Delay and Self-Protect Characteristics"; Superconductor Science and Technology; vol. 32, No. 4; Feb. 20, 2019; 14 Pages.
Tanaka, et al.; "Development of the Current Bypassing Methods into the Transverse Direction in Non-insulation HTS Coils"; Physics Procedia; 27th International Symposium on Superconductivity; vol. 65; Jan. 1, 2015; 4 Pages.
Berzak et al., "Magnetic Diagnostics for Equilibrium Reconstructions in the Presence of Nonaxisymmetric Eddy Current Distributions in Tokamaks (invited);" Review of Scientific Instruments, vol. 81, No. 10; Oct. 14, 2010; 7 Pages.
Chavan et al., "The Magnetics Diagnostic Set for ITER;" Journal Article from Fusion Engineering and Design, vol. 84; Available Online Feb. 4, 2009; pp. 295-299; 5 Pages.
Chen et al., "Upgrade of the Magnetic Diagnostic System for Restart of HT-6M Operation;" Chinese Physics B, vol. 31, No. 12; Jul. 8, 2022; 9 Pages.
Costley, "Towards Diagnostics for a Fusion Reactor;" IEEE Transactions on Plasma Science, vol. 38, No. 10; Oct. 2010; 10 Pages.
Gerhardt et al., "Techniques for the Measurement of Disruption Halo Currents in the National Spherical Torus Experiment;" Review of Scientific Instruments, vol. 82; Oct. 1, 2011; 9 Pages.
Granetz et al., "Magnetic Diagnostics in Alcator C-MOD;" Review of Scientific Instruments, vol. 61, No. 10, Part II; Oct. 1990; 3 Pages.
Hartfuss et al., "Diagnostics for Steady State Plasmas;" Topical Review; Plasma Physics and Controlled Fusion, vol. 48, No. 10; Oct. 1, 2006; 68 Pages.
Lee et al., "Magnetic Diagnostics for Korea Superconducting Tokamak Advanced Research;" Review of Scientific Instruments, vol. 72, No. 1; Jan. 2001; 3 Pages.
Moreau et al., "Development of a Magnetic Diagnostic Suitable for the ITER Radiation Environment;" Proceedings of the 1st International Conference on Advancements in Nuclear Instrumentation, Measurement Methods and Their Applications (ANIMMA 2009); Jun. 2009; 8 Pages.
Moreau et al., "The New Magnetic Diagnostics in the WEST Tokamak;" Review of Scientific Instruments, vol. 89, No. 10; Jul. 26, 2018; 5 Pages.
Neyatani et al., "Development of Magnetic Sensors in JT-60 Upgrade;" Proceedings of the IEEE/NPSS Symposium on Fusion Engineering; Sep. 30-Oct. 3, 1991; 6 Pages.
Shakeri et al., "Measurement of Plasma Current in Damavand Tokamak Using Magnetic Probes Assembly as a Discrete Rogowski Coil;" Fusion Engineering and Design, vol. 168; Mar. 2, 2021; 7 Pages.
Strait, "Magnetic Diagnostic System of the DIII-D Tokamak;" Review of Scientific Instruments, vol. 77, No. 2; Feb. 9, 2006; 14 Pages.
Sushkov et al., "Design of Inductive Sensors and Data Acquisition System for Diagnostics of Magnetohydrodynamic Instabilities on the T-15MD Tokamak;" Fusion Engineering and Design, vol. 146; Dec. 31, 2018; 5 Pages.
PCT Invitation to Pay Additional Fees and Partial Search Report dated Feb. 19, 2024 for International Application No. PCT/US2023/076758; 11 Pages.
PCT International Search Report and Written Opinion dated Apr. 9, 2024 for International Application No. PCT/US2023/076758; 28 Pages.
International Search Report and Written Opinion dated Apr. 29, 2020 for International Application No. PCT/2019/067116; 14 Pages.
Response to European Examination Report dated Jun. 26, 2024 for European Patent Application No. 20736847.3; Response filed on Nov. 25, 2024; 16 pages.
Korean Final Office Action (with English translation) dated Nov. 11, 2024 for Korean Patent Application No. 10-2021-7041886; 5 pages.
Korean Office Action (with English translation) dated May 23, 2024 for Korean Application No. 10-2021-7041886; 18 pages.
International Search Report and Written Opinion dated Jun. 5, 2024 for International Application No. PCT/US2024/013492; 14 pages.
Response to Korean Office Action dated May 23, 2024 for Korean Patent Application No. 10-2021-7041886; Response (with English translation of Amended Claims) filed on Sep. 23, 2024; 95 pages.
Japanese Office Action (with English translation) dated Jun. 12, 2024 for Japanese Patent Application No. 2021-574940; 12 pages.

(56) References Cited

OTHER PUBLICATIONS

Response to Japanese Office Action (with English translation) dated Jun. 12, 2024 for Japanese Patent Application No. 2021-574940; Response filed on Nov. 12, 2024; 29 pages.
Response to Final Office Action (with English translation of Amended Claims) dated Nov. 11, 2024 for Korean Patent Application No. 10-2021-7041886; Response filed on Jan. 7, 2025; 19 pages.
European Examination Report dated Feb. 4, 2025 for European Patent Application No. 21743319.2; 4 pages.
Japanese Office Action (with English translation) dated Jan. 20, 2025 for Japanese Patent Application No. 2022-575308; 12 pages.
Examination Report dated Jun. 26, 2024 for European Patent Application No. 20736847.3; 8 pages.
European Communication pursuant to Article 94(3) EPC dated Dec. 11, 2025 for European Patent Application No. 20736847.3; 20 pages.
Response to Japanese Office Action (with machine English translation) dated Jan. 20, 2025 for Japanese Patent Application No. 2022-575308; Response filed on Apr. 23, 2025; 10 pages.
Japanese Office Action (with English translation) dated May 12, 2025 for Japanese Patent Application No. 2022-575308; 12 pages.
Response to Japanese Office Action (with machine English translation) dated May 12, 2025 for Japanese Patent Application No. 2022-575308; Response filed on Sep. 10, 2025; 12 pages.
Japanese Final Office Action (with English translation) dated Oct. 28, 2025 for Japanese Patent Application No. 2022-575308; 5 pages.
Office Action dated Nov. 27, 2025 for Korean Application No. 10-2022-7043417 with English Translation; 13 Pages.
Response to Office Action for Japanese Application No. 2022-575308 as filed on Dec. 25, 2025, with English Translation; 12 Pages.
Notice of Allowance dated Jan. 21, 2026 for Japanese Application No. 2022-575308 with English Translation; 5 Pages.
Korean Notice of Allowance (with English translation) dated Apr. 18, 2025, for Korean Patent Application No. 10-2021-7041886; 9 pages.
Japanese Petition for responding to the Reconsideration Report dated Jun. 20, 2025, for Japanese Patent Application No. 2021-574940; Petition (with machine English translation) dated Nov. 12, 2025; 10 pages.
Response to Communication Pursuant to Rule 161(1) and 162 EPC dated Jun. 19, 2024, for European Application No. 22826743.1, filed on Dec. 18, 2024; 14 pages.
Ravaioli, "CLIQ, A new quench protection technology for superconducting magnets"; Ph.D. Dissertation at University of Twente; Jun. 2015; 225 pages.
Restriction Requirement dated Jun. 17, 2025, for U.S. Appl. No. 17/616,362; 7 pages.
Response to Restriction Requirement dated Jun. 17, 2025, and Preliminary Amendment, for U.S. Appl. No. 17/616,362; Response filed Aug. 6, 2025; 8 pages.
Office Action dated Oct. 20, 2025, for U.S. Appl. No. 17/616,362; 13 pages.
Restriction Requirement dated Mar. 12, 2026, for U.S. Appl. No. 17/911,270; 7 pages.
Office Action dated Apr. 6, 2026, for U.S. Appl. No. 18/008,507; 30 pages.
Office Action dated Apr. 13, 2026, for U.S. Appl. No. 17/796,481; 28 pages.
Response to Korean Office Action (w/English translation) dated Nov. 27, 2025, for Korean Application No. 10-2022-7043417; Response filed Mar. 26, 2026; 49 pages.
Korean Notice of Preliminary Rejection (w/English translation) dated Feb. 13, 2026, for Korean Application No. 10-2024-7013379; 18 pages.
Trial and Appeal Decision (w/English translation) dated Mar. 2, 2026, for Japanese Application No. 2021-574940; 9 pages.
Intention to Grant dated Apr. 13, 2026, for European Application No. 22826743.1; 9 pages.
Li et al., "Persistent Current Switch for HTS Superconducting Magnets: Design, Control Strategy, and Test Results"; IEEE Transactions on Applied Superconductivity, vol. 29, No. 2; Mar. 2019; 4 pages.
Response to Office Action dated Oct. 20, 2025, for U.S. Appl. No. 17/616,362; Response filed Jan. 16, 2026; 13 pages.
Notice of Allowance dated Apr. 22, 2026, for U.S. Appl. No. 17/616,362; 9 pages.
Notice of Allowance dated Jan. 23, 2026 for European Application No. 21743319.2; 8 Pages.
Chen, et al.; "Development of a Digital Quench Detection and Dumping Circuit With Constant Voltage System for SMES"; IEEE Transactions on Applied Superconductivity; vol. 20, No. 3; Jun. 2010; 4 Pages.
International Search Report and Written Opinion dated Sep. 7, 2020 for International Application No. PCT/US2020/038031; 22 Pages.
International Preliminary Report on Patentability dated Jul. 1, 2021 for International Application No. PCT/US2019/067116; 11 Pages.
International Preliminary Report dated Dec. 30, 2021 for International Application No. PCT/US2020/038031; 16 Pages.
International Search Report and Written Opinion of the ISA dated Sep. 6, 2021 for International Application No. PCT/US2021/024130; 20 Pages.
International Preliminary Report on Patentability dated Dec. 22, 2022 for International Application No. PCT/US2021/036814; 11 Pages.
International Preliminary Report on Patentability dated Mar. 26, 2020 for International Application No. PCT/US2021/02430; 13 Pages.
International Search Report and Written Opinion of the ISA dated Jan. 26, 2022 for International Application No. PCT/US2021/020225; 15 Pages.
International Patent Cooperation Treaty PCT Third Party Observation dated Jul. 7, 2022 for International Application No. PCT/US2021/020225; 4 Pages.
International Communication in Cases for Which No Other Form Is Applicable dated Jul. 7, 2022 for International Application No. PCT/US2021/020225; NPL References; 15 Pages.
International Preliminary Report on Patentability dated Sep. 22, 2022 for International Application No. PCT/US2021/020225; 11 Pages.
International Search Report and Written Opinion of the ISA dated Mar. 15, 2023 for International Application No. PCT/US2022/049517; 15 Pages.
Markiewicz, et al.; "900 MHz Wide Bore NMR Spectrometer Magnet at NHMFL"; IEEE Transactions on Applied Superconductivity; vol. 10, No. 1; Mar. 2000; 4 Pages.
Marchevsky; "Protection of Superconducting Magnet Circuits"; Lawrence Berkeley National Laboratory; USPAS 2017; http://uspas.fnal.gov/materials/17UCDavis/MachineProtection/uspas_mm.pdf; 29 pages.
Liao, et al.; "Signal De-Noising of Quench Detection by Real-Time Wavelet Analysis Algorithm for HTS Coil and Magnet"; IEEE Transactions on Applied Superconductivity; vol. 27, No. 4; Jun. 2017; 5 Pages.
Response to Communication Pursuant to Rules 161(1) and 162 EPC dated Jan. 25, 2022 for European Application No. 20736847.3 as filed on Jul. 25, 2022; 49 Pages.
Response to communication pursuant to Rules 161(2) and 162 EPC for European Application No. 21743319.2 as filed on Jul. 27, 2023; 15 Pages.

* cited by examiner

ELECTROMAGNETIC PULSE SOURCE USING QUENCHING SUPERCONDUCTING MAGNET

CROSS REFERENCE TO RELATED APPLICATIONS

This application is a U.S. National Stage of International Application PCT/US2019/067116 filed in the English language on Dec. 18, 2019 and entitled "Electromagnetic Pulse Source Using Quenching Superconducting Magnet," which is a continuation of and claims priority to U.S. application Ser. No. 16/223,707 filed Dec. 18, 2018. The contents of the above-referenced applications are hereby incorporated by reference as if fully set forth herein.

FIELD

This disclosure relates to superconducting magnets and, more particularly, to capturing electromagnetic pulse energy from quench events of superconducting magnets.

BACKGROUND

One type of superconducting magnet is formed from a superconducting material that is wound into a coil. When current flows through the coil it produced a magnetic field. Because of the zero resistance of superconductors, superconducting magnetics can store energy losslessly in magnetic fields, resulting in powerful magnetic fields which can be used in applications such as fusion power generation.

The superconducting material's temperature, current, and magnetic field must be maintained below thresholds so that the material acts as a superconductor. If any one of these factors increases to a value above the threshold, the superconducting material may lose its superconducting properties. When the threshold is passed, many superconducting magnets will experience a positive feedback of the loss of superconducting properties, resulting in a quench of the magnet.

A class of "no-insulation" superconducting magnets has normal conducting material (without superconducting properties), typically a metal such as steel or copper, between its turns. This allows current to flow across turns in the case of quench events. This cross-turn current flow results in a decrease in the magnet inductance, which then drives a voltage into inductively coupled structures in an attempt to maintain magnetic flux. Such a quench propagates electromagnetically and has been termed a "quench tsunami" and a "quench avalanche".

SUMMARY

In an embodiment, a system comprises a superconducting magnet comprising a coil of superconducting material, the coil comprising two electrical terminals, wherein at least a portion of the windings of the coil are separated by an electric conductor; a charging circuit coupled to the two terminals to drive a current through the coil to charge the superconducting magnet, and configured to charge the coil to a condition such that the coil enter a quench condition where current flows from one turn of the coil to another turn of the coil through the electric conductor, wherein a loss of inductance due to the quench condition causes electromagnetic radiation; and a receiver circuit comprising an inductive element positioned so that the inductive element is mutually-coupled to the coil and the electromagnetic radiation causes a voltage to be induced across the inductive element.

One or more of the following features may be included.

The charging circuit may comprise a current source to drive current through the coil.

The charging circuit may be configured to drive a current through the coil that exceeds a superconducting threshold of the coil to initiate the quench condition.

The charging circuit may be configured to vary the current through the coil so that, during a first time period, the current does not exceed the superconducting threshold and the coil acts as a superconductor and, during a second time period, the current exceeds the superconducting threshold and the quench condition is initiated.

The charging circuit may be configured to vary the current so that the current alternatingly exceeds and does not exceed the superconducting threshold.

A cooling system may be included to cool the coil below a superconducting threshold temperature of the coil.

The cooling system may comprise a cooling controller circuit to control the temperature of the coil.

The cooling controller circuit may be configured to cause the temperature of the coil to exceed the superconducting threshold temperature to initiate the quench condition.

The cooling controller may be configured to control the temperature of the coil so that, during a first time period, the temperature of the coil does not exceed the superconducting threshold temperature and the coil acts as a superconductor and, during a second time period, the temperature of the coil exceeds the superconducting threshold temperature and the quench condition is initiated.

A heating system may also be included.

The heating system may be configured to heat the coil to a temperature that exceeds a superconducting threshold temperature to induce the quench event.

The heating system may comprise a heating controller circuit to control the temperature of the coil.

A magnetic source circuit may be included. The magnetic source circuit may be configured to generate a magnetic field about the coil that exceeds a superconducting threshold magnetic field strength to induce the quench event.

In another embodiment, a method comprises: driving current through a superconducting magnet comprising a coil of superconducting material, wherein at least a portion of the windings of the coil are separated by an electrical conductor; causing a quench event to occur by controlling the current, by a control circuit, so that the current exceeds a superconducting current threshold of the superconducting magnet and flows through the electrical conductor, causing a reduction in an inductance of the coil and generation of an electromagnetic pulse; and converting, by a receiver circuit, electromagnetic power of the electromagnetic pulse into electrical power.

The electromagnetic power may be used to drive a load.

The electromagnetic power may be used to charge a battery.

The receiver circuit may include a plasma stream.

The control circuit may detect when the quench event occurs.

The control circuit may repeatedly cause the quench event, by repeatedly recharging the superconducting magnet and increasing the current beyond the superconducting threshold.

The control circuit may heat and/or cool the superconducting magnet by controlling a heating and/or cooling system controlled by the control circuit.

The control circuit may cause the quench event by controlling the heating and/or cooling system to cause the temperature of the superconducting magnet to exceed a superconducting threshold temperature.

The control circuit repeatedly causing the quench event by repeatedly cooling the superconducting magnet below the superconducting threshold temperature and causing the temperature of the superconducting magnet to exceed the superconducting threshold temperature.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

This disclosure relates to systems for electromagnetically transferring the magnetic energy stored in a superconducting magnet quickly to another system.

Figure 1:
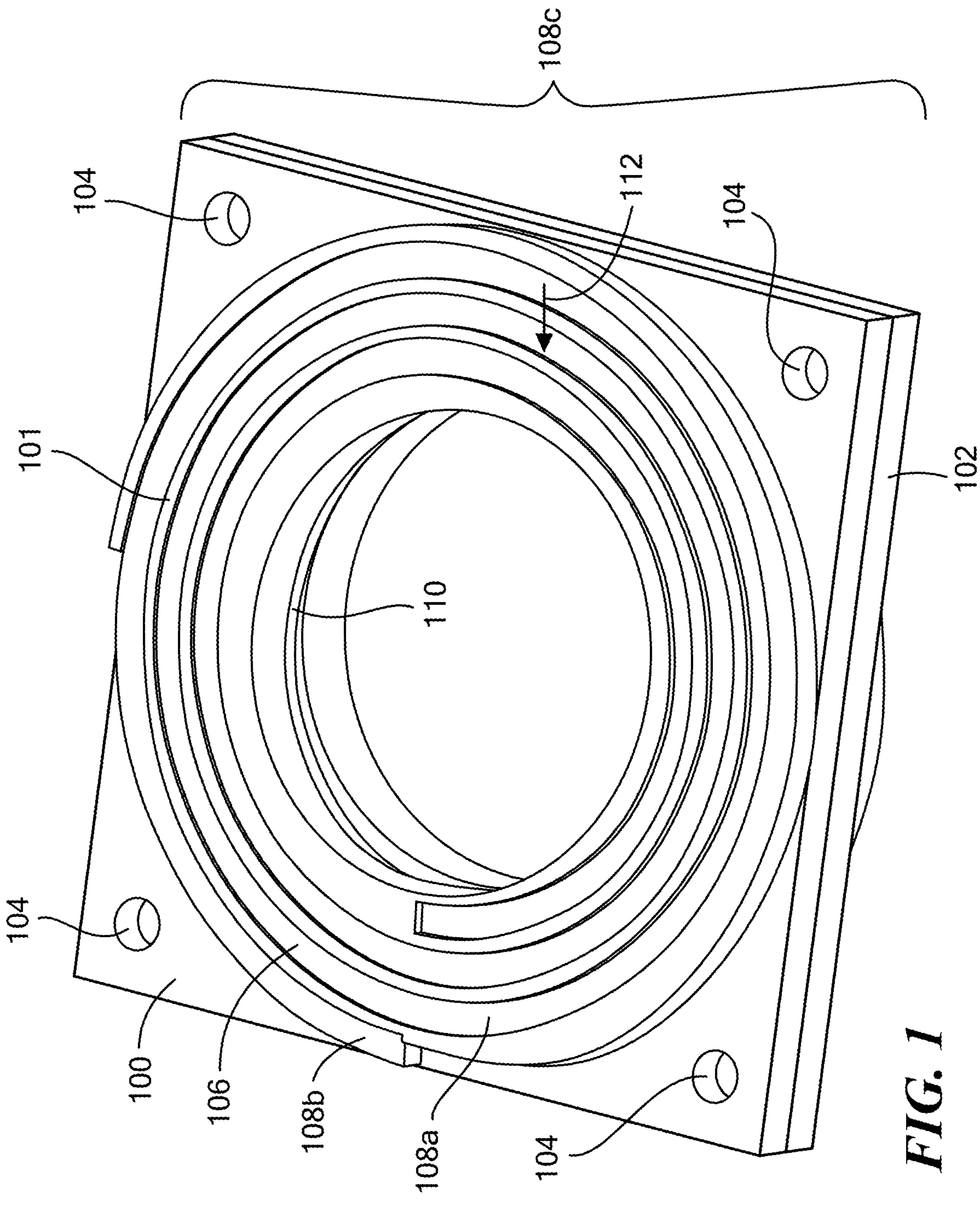
FIG. 1 is a perspective view of a coiled superconducting magnet.

FIG. 1 is a diagram of a superconducting magnet 108*c*, which may be in the form of a superconducting tape 108*b* comprising a superconducting material 108*a*, (or more simply a "superconductor"). In embodiments, superconducting magnet 108*c* may form a coil without insulation between the individual coils of superconducting tape 108*b*. For example, superconducting tapes 108*b* may be coiled in a channel 106 of a metallic, conductive plate 100. Plate 100 may include ridges 101 positioned between the coils. Although the metallic ridges are conductors, their conductivity may be significantly lower than that of superconductor 108*a* when superconductor 108*a* is in a superconducting state. In this case, because the conductivity of the plate is lower than the conductivity of the superconducting material, the conductive metal of plate 100 and/or ridges 101 may act as an insulator when there are negligible voltages in the magnet, for example when the magnet is operating in steady state.

In embodiments, the superconducting magnet 108*c* may be formed from superconductors having different geometries and shapes. For example, superconducting tape 108*b* may be replaced by a superconducting wire, a superconducting plate, or any other geometry that can support superconducting tape 108*b*.

In certain embodiments, plate 100 may be a stacked-plate assembly. Plate 100 may be disposed over another plate 102 such that interface apertures 104 are aligned and can be used to fasten the plates together.

Plate 102 may also contain a coil of superconducting tape 110. In embodiments, tape 108*b* and tape 110 may be electrically coupled in series to form a longer winding of superconducting tape. Coils of superconducting tape may be threaded throughout multiple conducting plates to produce a superconducting tape coil that winds along the entire length of the respective magnetic coil.

Although metallic plates are used as an example, other materials and geometries may be used. In some embodiments, the windings of the superconducting tape do not have insulating material between at least some of the turns. Some amount of insulating material may be included but the turns are not fully insulated from one another such that the structure still functions as a non-insulated (NI) magnet. A conducting material such as metal or a conductive ceramic may be placed between at least some of the turns of the superconducting magnet.

As noted, in embodiments, superconducting magnet 108*c* may be configured to operate without any turn-to-turn insulation. In other words, turns of superconducting magnet 108*c* may be wound atop each other and/or separated by a conductive material such as the metal used to form plate 100. When conditions are met so that superconductor 108*a* is operating as a superconductor, its resistance to current may be much lower than the resistance of other conductors such as the metal of plate 100. Under these conditions, even though plate 100 is formed from a traditional conducting metal (without superconducting properties), the path through superconductor 108*a* may be the path of least resistance. Thus, when there are relatively low voltages the current will be confined to flow primarily through the superconductor 108*a* and will not substantially flow from turn to turn of magnet 108*c*.

If, however, conditions change so that, during operation, superconducting tape 108*b* loses (in whole or in part) its superconducting properties, current may begin to flow from turn to turn of superconducting magnet 108*c*, in a direction shown by arrow 112 instead of flowing through the superconducting turns (i.e. current may begin to flow across turns of the superconducting magnet through the normal conductor instead of flowing exclusively through the superconducting turns). This phenomenon, when the tape loses its superconducting properties and the current begins to flow from turn to turn, may be referred to as quenching.

Although the example shown in FIG. 1 includes metallic plates that are used to hold superconducting tape 108*b*, this is not a requirement. Any physical arrangement can be used.

Figure 2:
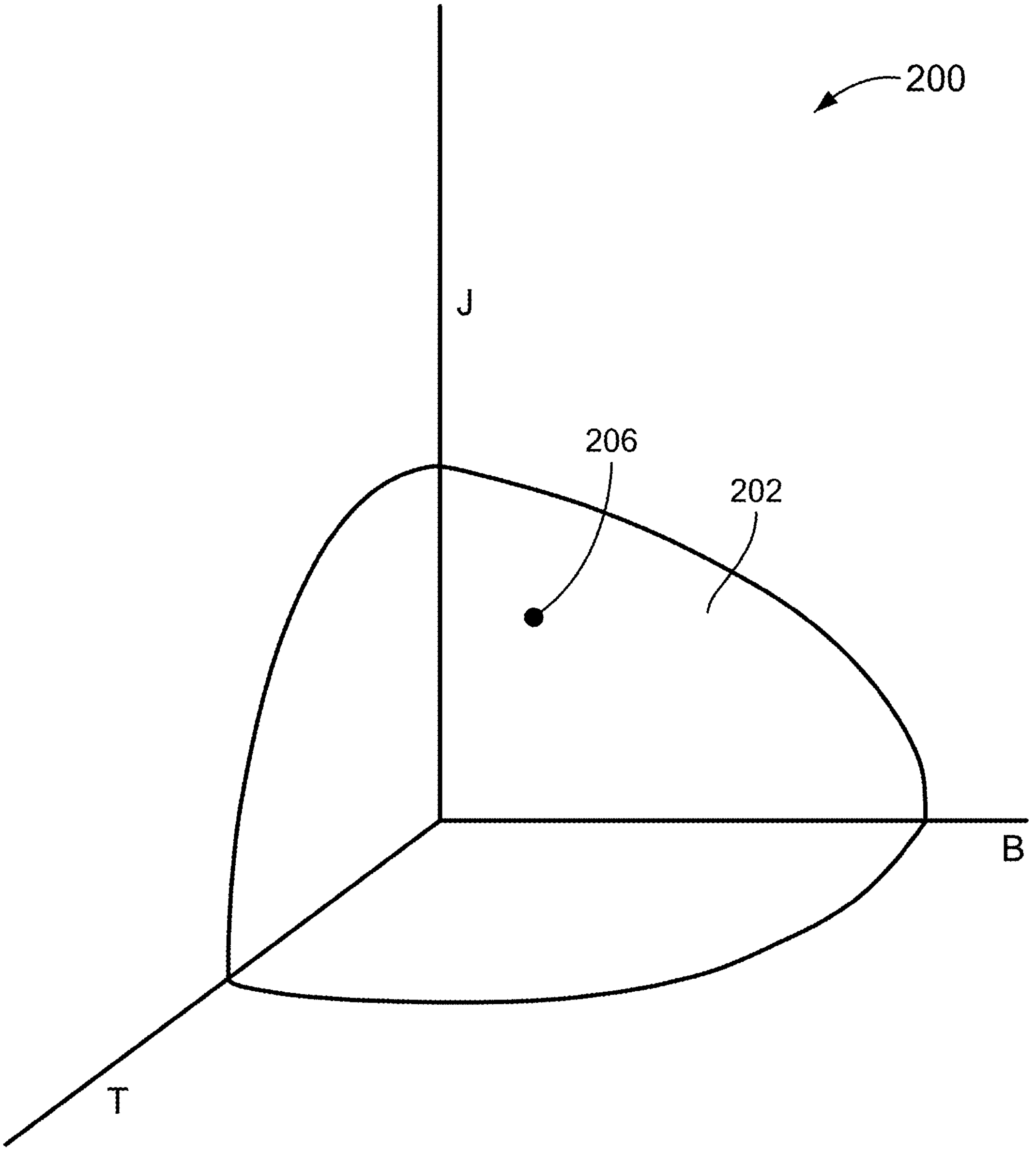
FIG. 2 is a graph of a superconducting model of a superconducting magnet.

Referring to FIG. 2, the three-dimensional graph represents an operating model 200 for superconductor 108*a*. The J axis represents the current density flowing through the superconductor 108*a*, the B axis represents the magnetic field in the superconductor 108*a*, and the T axis represents the temperature of the superconductor 108*a*.

Curve 202 represents the boundary of superconductivity of superconductor 108*a*. While superconductor 108*a* is operating at a point below curve 202, it may act as a superconductor. However, if the current density J, magnetic field B, and/or temperature T becomes too high and the operating point moves above curve 202, superconductor 108*a* may lose its superconducting properties, in whole or in part, and begin to quench.

Figure 3:
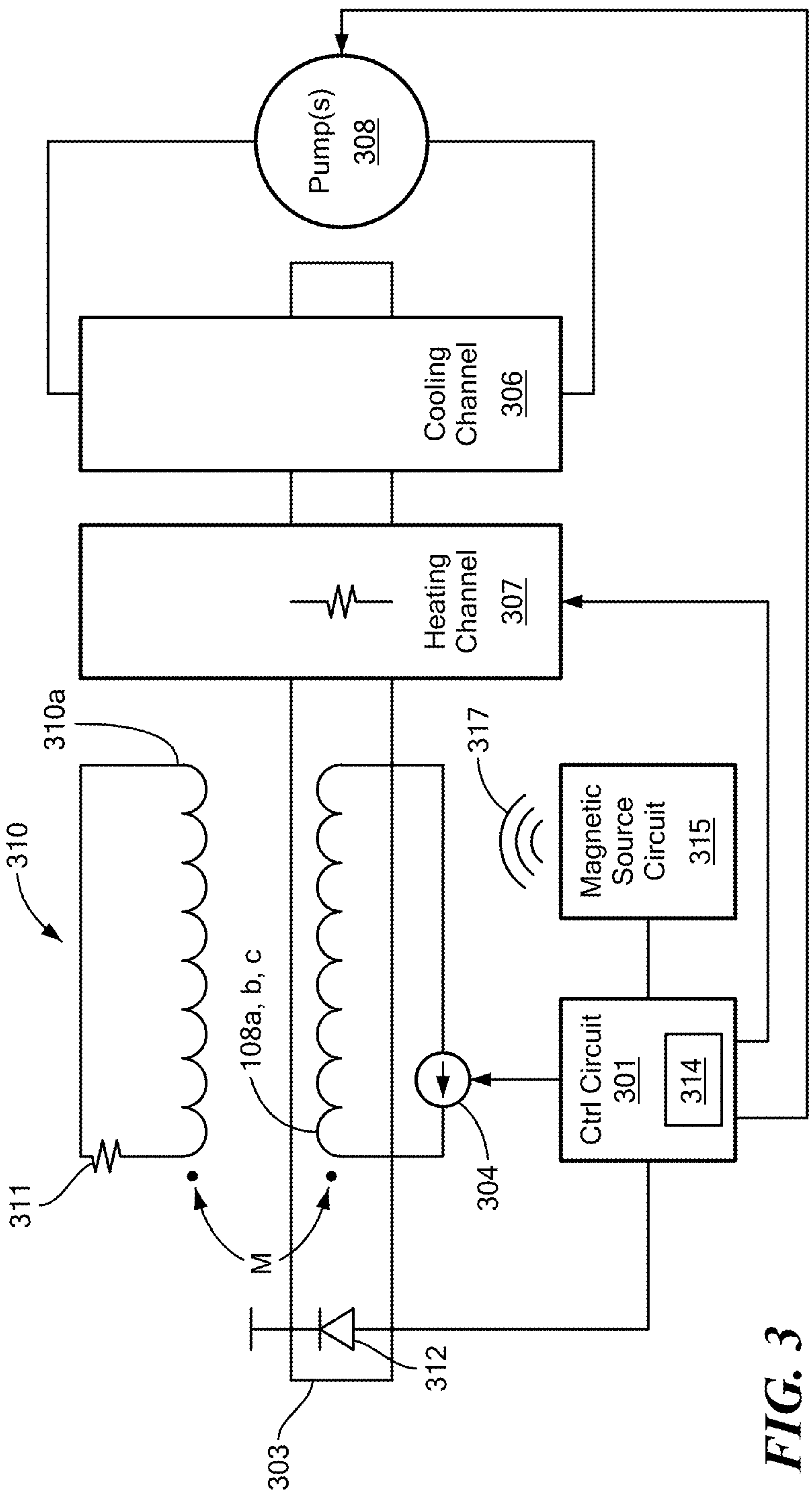
FIG. 3 is a block diagram of a control system for controlling a superconducting magnet and an electromagnetic pulse receiver circuit.

Referring to FIG. 3, a system 300 for controlling superconducting magnet 108*c* may include control circuit 301. Control circuit 301 may monitor the state of superconducting magnet 108*c* and induce a quenching effect to generate electromagnetic pulses. Control circuit 301 may be coupled to a variable current source 304 that drives current through superconducting magnet 108*c*, and control circuit 301 may vary the current through superconducting magnet 108*c* by controlling variable current source 304.

Superconducting tape 108*b* may be supported by a conductive substrate 303. In an embodiment, substrate 303 may be the same as or similar to metallic plate 100. In other embodiments, substrate 303 may be formed from another type of conductive material and/or a substrate having a different geometry, so long as current can flow through substrate 303 from turn to turn when a quench occurs.

During normal operation, current source 304 may drive current through superconducting magnet 108*c* below a current threshold so that superconductor 108*a* acts as a superconductor. However, to induce a quench, control circuit 301 may increase and/or pulse the current through superconductor 108*a* to a point above the superconducting threshold. As the current exceeds the threshold, the superconductor 108*a* may cease to act as a superconductor. When this happens, the conductivity of superconductor 108*a* (or a portion of superconducting tape) may decrease so that it is no longer infinite (or substantially infinite), and in some cases may decrease such that it is comparable to or lower than the conductivity of substrate 303. Thus, current may flow through substrate 303 directly from one turn of superconducting magnet 108*c* to another. This may result in a rapid loss of inductance of superconducting magnet 108*c* and an induced voltage in inductively coupled structures, which will be discussed below.

In embodiments, the threshold value of the current (or magnetic field B or temperature T) of superconductor 108*a* may be a variable threshold based on a model 200 of superconductor 108*a*. For example, the current threshold may be defined by the surface of curve 202 (see FIG. 2), which may change depending on the operating point of the magnetic field B and temperature T.

A cooling system may be coupled to superconducting magnet 108*c* to maintain and control temperature of superconductor 108*a*. During normal operation, the cooling system may maintain the temperature of superconductor 108*a* below a superconducting threshold. However, to induce a quench, the cooling system may allow the temperature of superconductor 108*a* to exceed the threshold. In some embodiments, a heating system (e.g. comprising heating channel 307) may be used to increase the temperature of superconductor 108*a* to a temperature that exceeds the threshold. The combination of a heating and cooling system may provide increased control over the temperature of superconductor 108*a* as well as increased speed in heating and cooling. The heating system may include an electric heater (e.g., a resistor), a conduction heating system, or any type of heating system that can heat superconductor 108*a*. When the temperature of superconductor 108*a* exceeds the superconducting threshold temperature, the superconductor may cease to operate as a superconductor and a quench condition may be initiated.

In embodiments, the threshold value for the temperature of superconductor 108*a* may be a variable threshold based on a model of superconductor 108*a*. For example, the temperature threshold may be defined by the surface of curve 202 (see FIG. 2), which may change depending on the operating point of the magnetic field B and current density J.

The heating and cooling system may include a liquid cooling channel 306 and/or a heating channel 307 coupled to superconducting magnet 108*c*. In embodiments, liquid cooling channel 306 and/or heating channel 307 may be closely thermally coupled to superconducting tape 302 to maximize the cooling that cooling channel 306 can provide to the tape and the heating that heating channel 307 can provide to the tape. For example, cooling channel 306 and/or heating channel 307 may be physically coupled to a thermal conductor (such as a copper strip or plate, not shown), which in turn is directly physically coupled to superconducting tape 302.

In embodiments, cooling channel 306 may be a pipe or tube that contains a cooling fluid. Pump 308 may pump the cooling fluid through cooling channel 306 so that it circulates through superconducting magnet 108*c* and removes heat. Although not shown, the cooling system may also include a condenser, a compressor, a cooling vat, and/or a cooling tower, etc. Heating channel 307 may be (or may include) an electrical (e.g., resistive) heater coupled to control circuit 301. In some embodiments, heating channel 307 may be a liquid or gas heat channel which may be coupled to pump 308, etc.

Control circuit 301 may also be coupled to control the heating and cooling systems. For example, control circuit 301 may control pump 308, a condenser (not shown), a compressor (not shown), an electric heater, or other elements of the heating and/or cooling systems to provide heating and cooling to superconducting magnet 108*c*. In general, control circuit 301 may be able to control the amount of heating and cooling that the heating and/or cooling system provides to superconducting magnet 108*c* by operating pump 308 (or other heating and cooling elements) at different speeds, by turning a compressor or condenser or heating element on and off, etc.

Control circuit 301 may monitor the state of superconducting magnet 108*c*. For example, control circuit 301 may be coupled to a magnetic field sensor (e.g. see FIG. 5) to monitor the strength of the magnetic field produced by superconducting magnet 108*c*. Although shown as a loop sensor, magnetic field sensor 310 may be a Hall effect sensor, a magnetoresistance element, or any type of magnetic field detection device.

Control circuit 301 may also be coupled to temperature sensor 312, which may be thermally coupled to superconducting magnet 108*c* (and/or superconducting tape 302) so that control circuit 301 can monitor the temperature of superconducting magnet 108*c* (and/or superconducting tape 302). Although shown in FIG. 3 as a diode, any type of temperature sensor may be used.

In embodiments, superconductor 108*a* may be a so-called high temperature superconductor. In this case, the cooling system may be configured to maintain the temperature of superconductor 108*a* (and/or superconducting tape 108*b* at 4 Kelvin or higher to maintain superconducting performance. If, however, a quench is desired, the cooling system may allow the temperature to increase until superconducting tape enters a quench state.

Additionally, because control circuit 301 controls current source 304, control circuit 301 may monitor the amount of current flowing through superconducting tape 302. In embodiments, system 300 may include a current sensor (e.g. coupled to superconducting tape 108*b*, superconducting tape 302, and/or current source 304) that can sense the amount of current flowing through superconducting tape 108*b*. In this case, control circuit 301 may be coupled to the current sensor and may use the current sensor to monitor the current flowing through superconducting tape 108*b*.

Control circuit 301 may be implemented as a custom logic circuit, a programmed FPGA, a general-purpose computer programmed with software, a special-purpose computer programmed with software, or any type of circuit, system, or computing device that can act as a control system, and in some cases may control cooling to and current through superconducting tape 108*b*. In embodiments, control circuit 301 may include a memory 314 that can store data for use by control circuit 314. Memory 314 may be a non-volatile memory such as an EPROM, a volatile memory that is loaded with the data required by control circuit 301, or a hard-programmed memory such as a logic circuit that acts as a memory. In embodiments, memory 314 may contain data representing an operating model for superconductor 108*a* (and/or superconducting tape 302) and/or the superconducting thresholds mentioned above.

System 300 may include a magnetic field source circuit 315 coupled to control circuit 301. Magnetic field source circuit 315 may be an electromagnet or other device that can generate a steady state, repeating pulse, or single pulse magnetic field 317 in response to a signal from control circuit 301. Also, magnetic field source circuit 315 may be positioned in proximity to superconducting magnet 108*c* so that magnetic field 317 can increase the magnetic field B in and around superconducting magnet 108*c*. As noted above, if the magnetic field B increases above a superconducting threshold, superconductor 108*a* may cease to act as a superconductor. Thus, control circuit 301 may control magnetic field source circuit 315 to increase the magnetic field B in superconducting magnet 108*c* to induce a quench event.

System 300 may also include a receiver circuit 310 to receive electromagnetic pulses cause by the quench events of superconducting magnet 108*c*. When a quench event occurs superconductor 108*a* (or a portion of superconductor 108*a*) ceases to act as a superconductor and current may flow through from turn to turn of superconducting magnet 108*c* through substrate 303. This reduces the number of turns and therefore reduces the magnet's inductance. When this happens, superconducting magnet 108*c* may induce a voltage in inductively coupled structures.

Receiver circuit 310 may comprise a coil such as a coupled inductor 310*a* that will experience the induced voltage. Inductor 310*a* may be coupled to a load 311 to put its induced voltage across the load. Load 311 may be any type of load such as another circuit, an energy storage device such as a battery that is charged by receiver circuit 310, or the like.

Figure 5:
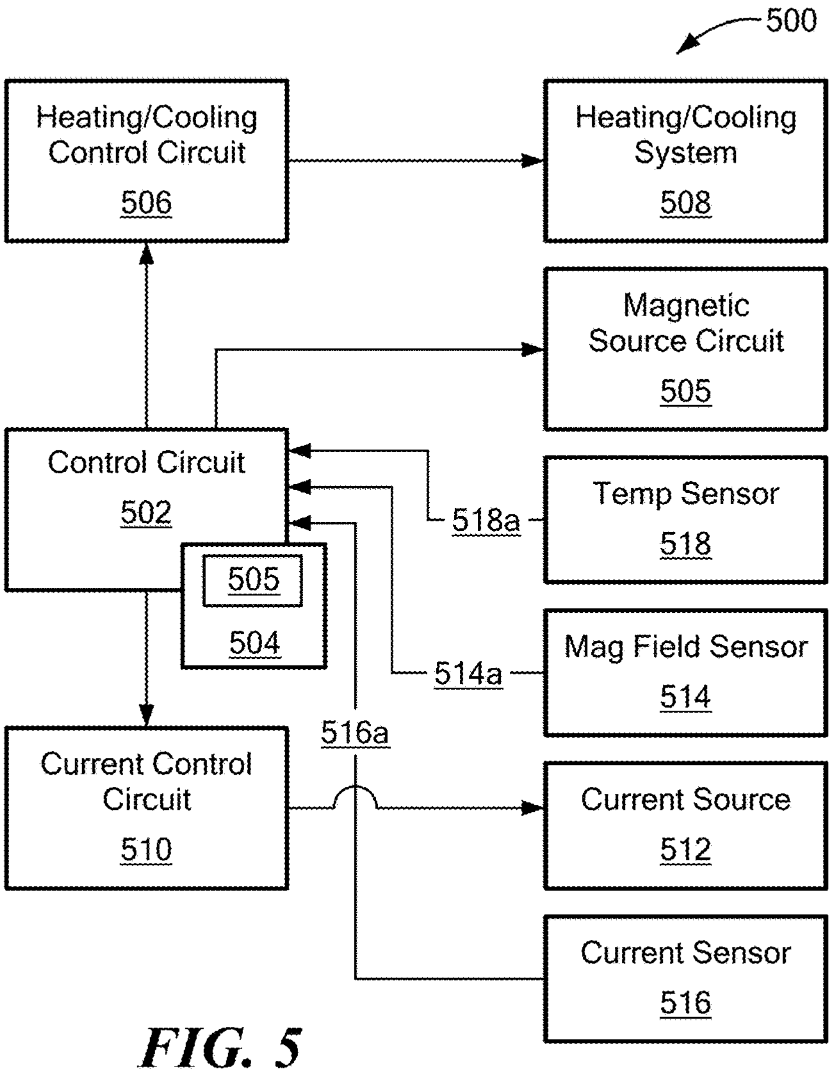
FIG. 5 is a block diagram of a control system for controlling a superconducting magnet.

In embodiments, control circuit 301 may detect when a quench occurs by monitoring the temperature, current, and/or magnetic field associated with superconducting magnet 108*c*. When a quench occurs, the temperature may increase, the current through superconductor 108*a* may be reduced, and the magnetic field produced by superconducting tape 108 may locally spike, for example. Control circuit 301 may detect that a quench has occurred by monitoring the temperature, current, and magnetic field (e.g., with a magnetic field sensor (e.g. as shown in FIG. 5) such as a loop sensor, Hall effect element, magnetoresistive element, etc.) to detect these events.

Figure 4:
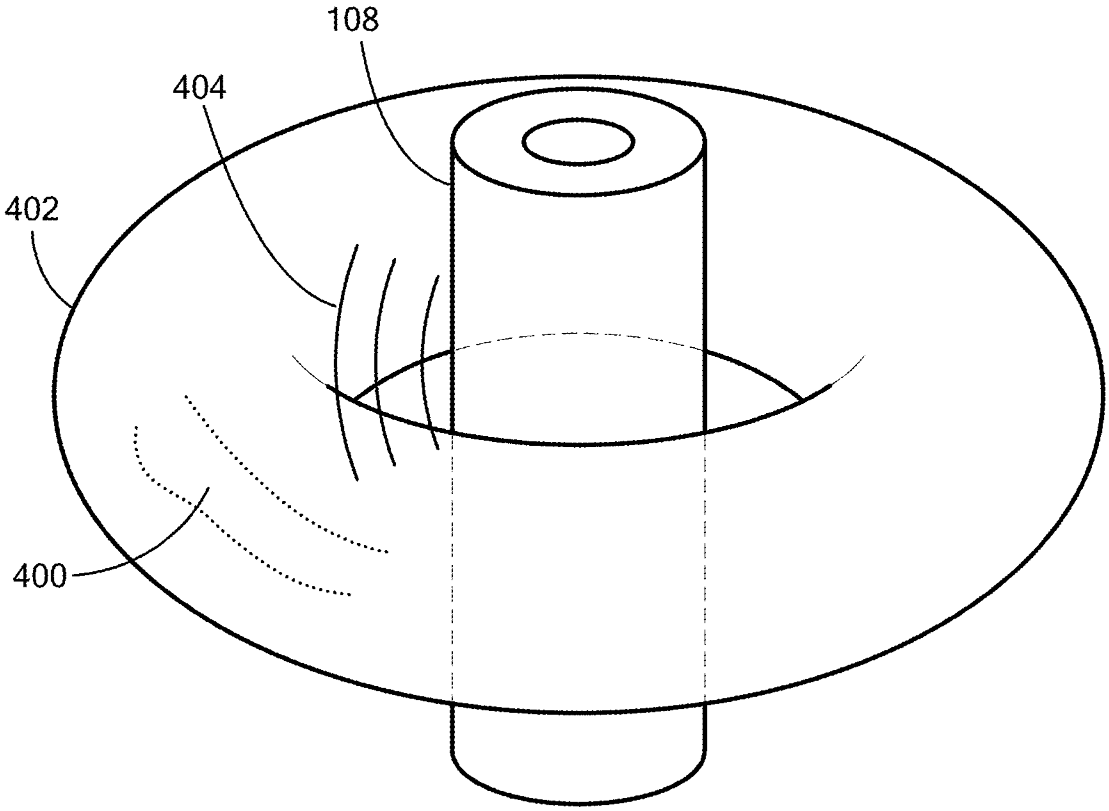
FIG. 4 is a block diagram of a superconducting magnet and plasma to receive an electromagnetic pulse.

Referring to FIG. 4, a toroidal plasma 400 may act as the inductor to receive a voltage pulse from a quench event. For example, a fusion power generator system may include a toroidal plasma 400 used as fuel in a fusion reaction. Superconducting magnet 108*c* may be positioned so that the electromagnetic pulse 404 generated by a quench event can be received by plasma 400. The voltage induced by the electromagnetic pulse 400 may, for example, drive electrical current through plasma 400. Thus, the electromagnetic pulse may increase, decrease, or change the direction of the current flowing through plasma 400. Although a fusion power generator system is used as an example, any system that includes an inductively coupled plasma stream may be used to receive electromagnetic pulse 404.

In embodiments, data representing model 200 may be stored in memory 314. Model 200 may be represented as a formula, a series of formulas, a data table, a lookup table, or any other type of data that can be used to represent the superconducting operating of superconductor 108*a*.

Using model 200, control circuit 301 may cause superconductor 108*a* to quench. For example, assume that control circuit 301 is operating the superconducting tape at a point 206 near the surface of curve 202 (see FIG. 2). Control circuit 301 may increase the current density J through superconductor 108*a*, allow the temperature T to rise, and/or induce an external magnetic field so that operating point 206 moves above the surface of curve 202, which may result in superconductor 108*a* losing its superconducting properties. When this happens, a quench event may occur.

In embodiments, a quench event may result in a quench avalanche. For example, if one turn of superconducting magnet 108*c* loses its superconducting properties, quenches, and the current shorts to adjacent turns, it will cause induce a voltage on adjacent turns, causing an increased current. This may result in the adjacent turn also quenching and possibly causing another adjacent coil to quench, and so on. Each quench event may result in an electromagnetic pulse, or may increase the electromagnetic pulse, which may be received by the receiver circuit.

Referring to FIG. 5, a block diagram illustrates a control system 500 for controlling superconducting magnet 108*c*. Control system 500 may be the same or similar to the control system comprising control circuit 301 described above in connection with FIG. 3.

Control system 500 may include a control circuit 502 with a memory 504. In embodiments, memory 502 may contain data representing an operating model 505 of a superconductor, like model 200 in FIG. 2. Control circuit 502 may be coupled to a heating and cooling control circuit 506 that controls a heating and/or cooling system 508. Cooling system 508 may be the same or similar to the heating and cooling system described above in connection with FIG. 3.

Control circuit 502 may also be coupled to current control circuit 510 which may control current source 512. Current source 512 may be the same or similar to current source 304 in FIG. 3.

Also, control circuit 502 may be coupled to a magnetic source circuit 505 that can generate a steady or pulsed external magnetic field. Magnetic source circuit 505 may be the same as or similar to magnetic source circuit 315 in FIG. 3. Control circuit 502 may control magnetic source circuit 505 to create a steady state or pulsed magnetic field to induce superconductor 108*a* to quench.

In embodiments, cooling control circuit 506, current control circuit 510, and control circuit 502 may be separate circuits. In other embodiments, heating and cooling control circuit 506 and current control circuit 510 may be integrated into control circuit 502.

Magnetic field sensor 514 may measure the magnetic field around superconducting magnet 108*c* and provide feedback signal 514*a*, representing the strength of the detected magnetic field, to control circuit 502. Current sensor 516 may measure the value of the current flowing through superconducting tape 108*b* and generate feedback signal 516*a*, representing the value of the current. Also, temperature sensor 518, which may be the same or similar to temperature sensor 312, may measure the temperature of superconducting tape and feedback signal 518*a*, representing the temperature, to control circuit 502.

System 500 may provide a plurality of feedback loops for controlling the superconducting magnet 108*c*. For example, system 500 may feed back temperature information (e.g. signal 518*a*), current information (e.g. signal 516*a*), and magnetic field strength information (e.g. signal 514*a*) to control circuit 502. Control circuit 502 may use these signals and the model of superconducting tape to control the current and cooling of the magnetic coil to operate the magnetic coil As described above regarding FIG. 3, control circuit 502 may be able to cause superconducting magnet 108*c* to quench. For example, assume that control circuit 301 is operating the superconductor at a point 206 on or near the surface of curve 202. Control circuit 502 may increase the current density J through superconductor 108*a* and/or allow the temperature T to rise so that operating point 206 moves above the surface of curve 202, which will result in superconducting tape losing its superconducting properties. When this happens, a quench event may occur.

In embodiments, control circuit 502 and/or cooling circuit 506 and/or current control circuit 510 may be implemented as state machines.

Control circuit 502 may be configured to repeatedly and/or periodically cause quench events in superconducting magnet 108*c*. In embodiments, control circuit 502 may charge superconducting magnet 108*c* until it is operating at the cusp of a quench event. Then, control circuit 502 may increase the temperature or current or magnetic field to initiate a quench event and the resulting electromagnetic pulse. After the quench event, the control circuit 502 may cool superconducting magnet 108*c* and drive current through superconductor 108*a* so that it operates under curve 202 (see FIG. 2) and acts as a superconductor. Subsequently, control circuit 502 may again charge superconducting magnet 108*c* until it is operating at the cusp of a quench event, and again increase the temperature and/or current to initiate a subsequent quench event. Control circuit 502 may repeat this process periodically or in response to a trigger to cause electromagnetic pulses from quench events that can be received by the receiver circuit.

Figure 6:
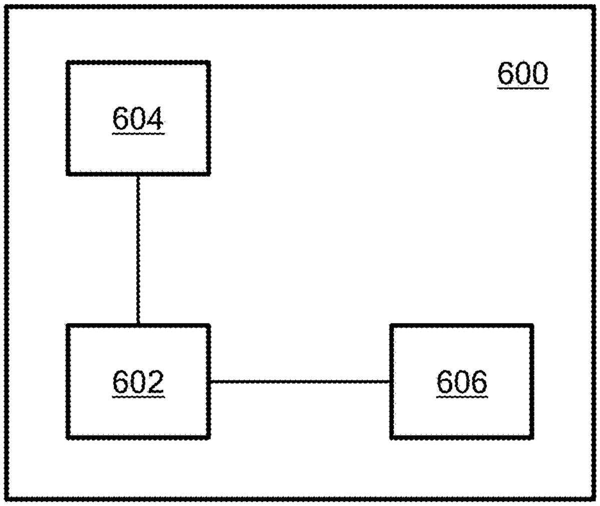
FIG. 6 is a block diagram of a computing system.

Referring to FIG. 6, some or all of the algorithms associated with control circuit 502, cooling control circuit 506, and/or current control circuit 510 may be implemented as software executing on a computing device, such as computing device 600. Computing device 600 includes a processor 602, a random-access memory (RAM) 604, and a storage device 606, which may be a hard drive, a CD, a DVD, a flash drive, or any other type of non-volatile memory. Software instructions may be stored in RAM 604 and/or storage device 606. Processor 602 may be coupled to storage device 606 and/or RAM 604 so that processor 602 can read the software instructions. As processor 602 reads the software instructions, the software instructions may cause processor 602 to perform operations, as described above in relation to control circuit 502 and/or control circuit 301, for operating a magnetic coil. Although not shown, processor 602 and/or computing device 600 may include other inputs and outputs, such as inputs for receiving the signals from the sensing elements, GPIO, power inputs, or other interfaces such as USB, SATA, HDMI, and the like.

Various embodiments are described in this patent. However, the scope of this patent should not be limited to the described embodiments, but rather should be limited only by the spirit and scope of the following claims.

The invention claimed is:

1. A system comprising:

a superconducting magnet comprising a coil of superconducting material, the coil comprising two electrical terminals, wherein at least a portion of the windings of the coil are separated by an electric conductor;

a charging circuit coupled to the two terminals to drive a current through the coil to charge the superconducting magnet, and configured to charge the coil to a condition such that the coil enters a quench condition where current flows from one turn of the coil to another turn of the coil through the electric conductor, wherein a loss of inductance due to the quench condition generates an electromagnetic pulse; and a receiver circuit comprising an inductive element positioned so that the inductive element is mutually-coupled to the coil and the electromagnetic pulse causes a voltage to be induced across the inductive element, wherein the charging circuit is configured to repeatedly cause the coil to enter a quench condition to repeatedly generate electromagnetic pulses.

2. The system of claim 1 wherein the charging circuit comprises a current source to drive current through the coil.

3. The system of claim 1 wherein the charging circuit is configured to drive a current through the coil that exceeds a superconducting threshold of the coil to initiate the quench condition.

4. The system of claim 3 wherein the charging circuit is configured to vary the current through the coil so that, during a first time period, the current does not exceed the superconducting threshold and the coil acts as a superconductor and, during a second time period, the current exceeds the superconducting threshold and the quench condition is initiated.

5. The system of claim 4 wherein the charging circuit is configured to vary the current so that the current alternatingly exceeds and does not exceed the superconducting threshold.

6. The system of claim 1 further comprising a cooling system to cool the coil below a superconducting threshold temperature of the coil.

7. The system of claim 6 wherein the cooling system comprises a cooling controller circuit to control the temperature of the coil.

8. The system of claim 7 wherein the cooling controller circuit is configured to allow the temperature of the coil to exceed the superconducting threshold temperature to initiate the quench condition.

9. The system of claim 6 wherein the cooling controller is configured to control the temperature of the coil so that, during a first time period, the temperature of the coil does not exceed the superconducting threshold temperature and the coil acts as a superconductor and, during a second time period, the temperature of the coil exceeds the superconducting threshold temperature and the quench condition is initiated.

10. The system of claim 1 further comprising a heating system.

11. The system of claim 10 wherein the heating system is configured to heat the coil to a temperature that exceeds a superconducting threshold temperature to induce the quench condition.

12. The system of claim 10 wherein the heating system comprises a heating controller circuit to control the temperature of the coil.

13. The system of claim 1 further comprising a magnetic source circuit configured to generate a magnetic field about the coil that exceeds a superconducting threshold magnetic field strength to induce the quench event.

14. A method comprising:

driving current through a superconducting magnet comprising a coil of superconducting material, wherein at least a portion of the windings of the coil are separated by an electrical conductor;

repeatedly causing a quench event to occur by controlling the current, by a control circuit, so that the current exceeds a superconducting current threshold of the superconducting magnet and flows through the electrical conductor, causing a reduction in an inductance of the coil and generation of electromagnetic pulses; and converting, by a receiver circuit, electromagnetic power of the electromagnetic pulses into electrical power.

15. The method of claim 14 wherein the electromagnetic power drives a load.

16. The method of claim 14 wherein the electromagnetic power charges a battery.

17. The method of claim 14 wherein the receiver circuit comprises a plasma stream.

18. The method of claim 14 further comprising detecting, by the control circuit, when the quench event occurs.

19. The method of claim 14 further comprising repeatedly causing the quench event, by the control circuit, by repeatedly recharging the superconducting magnet and increasing the current beyond the superconducting threshold.

20. The method of claim 14 further comprising heating and/or cooling the superconducting magnet by a heating and/or cooling system controlled by the control circuit.

21. The method of claim 20 further comprising causing, by the control circuit, the quench event by controlling the heating and/or cooling system to cause the temperature of the superconducting magnet to exceed a superconducting threshold temperature.

22. The method of claim 21 further comprising repeatedly causing the quench event by repeatedly cooling the superconducting magnet below the superconducting threshold temperature and causing the temperature of the superconducting magnet to exceed the superconducting threshold temperature.

23. A system comprising:

a magnet comprising:

a first coil including a superconducting material;

an electrical conductor between turns of the first coil;

one or more sensors configured to measure and generate one or more feedback signals responsive to a magnetic field around the magnet, a current through the first coil, and/or a temperature of the first coil;

an apparatus configured to control, using the one or more feedback signals, current and cooling of the first coil to operate the first coil and to induce a quench condition in the first coil in which current flows between the turns of the first coil through the electrical conductor; and a receiver circuit comprising a second coil coupled to the first coil to receive energy from the first coil electromagnetically in response to inducing the quench condition.

24. The system of claim 23, wherein the apparatus comprises a circuit configured to induce the quench condition at least in part by increasing a current through the first coil.

25. The system of claim 24, wherein the circuit is further configured to provide a current to the first coil to increase an amount of energy stored in the magnet.

26. The system of claim 23, wherein the apparatus comprises a temperature control system configured to induce the quench condition at least in part by raising a temperature of at least a portion of the superconducting material above a threshold.

27. The system of claim 23, wherein the apparatus comprises a magnetic source circuit configured to induce the quench condition at least in part by increasing a strength of a magnetic field in the magnet above a threshold.

28. The system of claim 23, wherein the second coil is coupled to the first coil to receive the energy from the first coil inductively in response to the quench condition.

* * * * *